US006998440B2

(12) United States Patent
Alarcon et al.

(10) Patent No.: US 6,998,440 B2
(45) Date of Patent: *Feb. 14, 2006

(54) POLYETHYLENE FILMS

(75) Inventors: Frederic Alarcon, Allee des Argelas (FR); Christopher James Frye, Dunblane (GB); David George Gilbert, Teddington (GB); Brian Leslie Turtle, Oxshott (GB)

(73) Assignee: BP Chemicals Limited, London (GB)

( * ) Notice: Subject to any disclaimer, the term of this patent is extended or adjusted under 35 U.S.C. 154(b) by 9 days.

This patent is subject to a terminal disclaimer.

(21) Appl. No.: 10/296,830

(22) PCT Filed: May 22, 2001

(86) PCT No.: PCT/GB01/02266

§ 371 (c)(1),
(2), (4) Date: Jun. 23, 2003

(87) PCT Pub. No.: WO01/92405

PCT Pub. Date: Dec. 6, 2001

(65) Prior Publication Data

US 2003/0229182 A1    Dec. 11, 2003

(30) Foreign Application Priority Data

Jun. 1, 2000  (GB) .................................. 0013343
Jun. 1, 2000  (GB) .................................. 0013344

(51) Int. Cl.
*C08F 8/00*      (2006.01)
*C08L 9/00*      (2006.01)
*C08L 23/00*     (2006.01)
*C08L 23/04*     (2006.01)

(52) U.S. Cl. ...................... 525/191; 525/232; 525/240

(58) Field of Classification Search ................ 525/191, 525/240, 232

See application file for complete search history.

(56) References Cited

U.S. PATENT DOCUMENTS

| 4,587,303 | A  | * | 5/1986  | Turtle ........................ 525/240 |
| 5,525,659 | A  | * | 6/1996  | Falla et al. ................. 524/257 |
| 6,123,827 | A  | * | 9/2000  | Wong et al. ................ 205/775 |
| 6,486,270 | B1 | * | 11/2002 | Garrison et al. .............. 526/65 |
| 6,613,841 | B2 | * | 9/2003  | Williams ..................... 525/191 |
| 6,642,339 | B1 | * | 11/2003 | Chai et al. ................ 526/348.1 |

FOREIGN PATENT DOCUMENTS

| EP | 0 168 928 A2 | 1/1986 |
| EP | 0 610 942 A2 | 8/1994 |
| EP | 0 755 971 A2 | 1/1997 |
| WO | 95/04761     | 2/1965 |
| WO | 94/14855     | 7/1994 |
| WO | 95/30714     | 11/1995 |
| WO | 97/44371 A   | 11/1997 |
| WO | 00/68285     | 11/2000 |

* cited by examiner

Primary Examiner—Nathan M. Nutter
(74) Attorney, Agent, or Firm—Finnegan, Henderson, Farabow, Garrett and Dunner, L.L.P.

(57) ABSTRACT

Novel stretch and blown films are prepared based on copolymers of ethylene and alpha-olefins having (a) a density in the range 0.900 to 0.940 (b) an apparent Mw/Mn of 2–3.4 (c) $I_{21}/I_2$ from 16 to 24 (d) activation energy of flow from 28 to 45 kJ/mol (e) a ratio Ea(HMW)/Ea(LMW)>1.1, and (f) a ratio g'(HMW)/g'(LMW) from 0.85 to 0.95. The films exhibit an excellent combination of strength and processability and are particularly suitable for use as either stretch films or blown films for use as heavy duty sacks. The preferred films show a dart impact of >1100 g and MD elongations of >500%.

6 Claims, No Drawings

POLYETHYLENE FILMS

The present invention relates to copolymers of ethylene and alpha-olefins in particular to low density copolymers and also to novel films produced from said copolymer having improved properties in particular improved stretch and creep characteristics.

In recent years there have been many advances in the production of polyolefin copolymers due to the introduction of metallocene catalysts. Metallocene catalysts offer the advantage of generally higher activity than traditional Ziegler catalysts and are usually described as catalysts which are single-site in nature. Because of their single-site nature the polyolefin copolymers produced by metallocene catalysts often are quite uniform in their molecular structure. For example, in comparison to traditional Ziegler produced materials, they have relatively narrow molecular weight distributions (MWD) and narrow Short Chain Branching Distribution (SCBD).

Although certain properties of metallocene products are enhanced by narrow MWD, difficulties are often encountered in the processing of these materials into useful articles and films relative to Ziegler produced materials. In addition, the uniform nature of the SCBD of metallocene produced materials does not readily permit certain structures to be obtained.

Recently a number of patents have published directed to the preparation of films based on low density polyethylenes prepared using metallocene catalyst compositions.

WO 94/14855 discloses linear low density polyethylene (LLDPE) films prepared using a metallocene, alumoxane and a carrier. The metallocene component is typically a bis(cyclopentadienyl) zirconium complex exemplified by bis(n-butylcyclopentadienyl) zirconium dichloride and is used together with methyl alumoxane supported on silica. The LLDPE's are described in the patent as having a narrow Mw/Mn of 2.5–3.0, a melt flow ratio (MFR) of 15–25 and low zirconium residues.

WO 94/26816 also discloses films prepared from ethylene copolymers having a narrow composition distribution. The copolymers are also prepared from traditional metallocenes (eg bis(1-methyl, 3-n-butylcyclopentadienyl) zirconium dichloride and methylalumoxane deposited on silica) and are also characterised in the patent as having a narrow Mw/Mn values typically in the range 3–4 and in addition by a value of Mz/Mw of less than 2.0.

However, it is recognised that the polymers produced from these types of catalyst system have deficiencies in processability due to their narrow Mw/Mn. Various approaches have been proposed in order to overcome this deficiency. An effective method to regain processability in polymers of narrow Mw/Mn is by the use of certain catalysts which have the ability to incorporate long chain branching (LCB) into the polymer molecular structure. Such catalysts have been well described in the literature, illustrative examples being given in WO 93/08221 and EP-A-676421.

Furthermore, WO 97/44371 discloses polymers and films where long chain branching is present, and the products have a particularly advantageous placement of the comonomer within the polymer structure. Polymers are exemplified having both narrow and broad Mw/Mn, for example from 2.19 up to 6.0, and activation energy of flow, which is an indicator of LCB, from 7.39 to 19.2 kcal/mol (31.1 to 80.8 kJ/mol). However, there are no examples of polymers of narrow Mw/Mn, for example less than 3.4, which also have a low or moderate amount of LCB, as indicated by an activation energy of flow less than 11.1 kcal/mol (46.7 kJ/mol).

We have now found that it is possible to prepare copolymers of ethylene and alpha-olefins having narrow Mw/Mn and low or moderate amounts of LCB. These polymers are suitable for many applications which will be known to those skilled in the art, but in particular are advantageous for preparing films with an excellent balance of processing, optical and mechanical properties.

In particular the present invention is particularly directed to stretch films with excellent cling properties and to blown films suitable for use for heavy duty sacks.

Our copending application WO 00/68285 describes copolymers of ethylene and an alpha olefin having 3 to 10 carbon atoms, said copolymers having (a) a density in the range 0.900 to 0.940
(b) an apparent Mw/Mn of 2–3.4
(c) $I_{21}/I_2$ from 16 to 24
(d) activation energy of flow from 28 to 45 kJ/mol
(e) a ratio Ea(HMW)/Ea(LMW)>1.1, and
(f) a ratio g'(HMW)/g'(LMW) from 0.85 to 0.95.

These copolymers may be used to prepare the full range of products normally manufactured from polyethylene copolymer products in the density range 0.900 to 0.940 kg/m³. Examples of applications for the copolymers include injection moulding, rotomoulding, extrusion into pipes, sheets, films, fibres, non-woven fabrics, cable coverings and other uses which will be known to those skilled in the art are particularly suitable for the production of films and sheets prepared using traditional methods well known in the art. Examples of such methods are film blowing, film casting and orientation of the partially crystallised product. The films exhibit good processability, improved optical and mechanical properties and good beat sealing properties.

WO 00/68285 described blown films from such copolymers having haze ranging from 3 to 20, dart impact >100 g and hexane extractables in the range 0.1–1.5%. Such films also exhibited a MD tear strength in the range 106–210 g/25 μm.

The application of polyethylene films in stretch wrapping has been considerably enhanced by the use of linear low density polyethylene (LLDPE) type products. When formed into a film for stretch wrap application, LLDPE products typically combine a high extensibility with good mechanical properties to provide a wrapping or collation function to be achieved in an economic and effective manner. In this respect, LLDPE has significant advantages over LDPE which, due to both its behaviour in extension and its mechanical performance, is not normally regarded as a product of choice for stretch wrapping applications.

Application of stretch wrap films may be either by hand or by machine. The film may be either wrapped directly onto the article or articles to be packaged, or it may undergo a pre-stretching operation prior to wrapping. Pre-stretching typically enhances the mechanical property of the film and provides a more effective packaging and more efficient coverage for a given unit mass of film. Hence the response of the film to either a pre-stretch or the stretch applied during wrapping is an important parameter affecting film performance. In particular for a given film width and thickness the efficiency with which an object is wrapped is affected by the degree to which the film can be thinned during the stretching and the loss of film width which may occur at the same time. The resistance to sudden impact events, puncture by sharp objects and the ability to maintain a tension sufficient to maintain the package in the desired shape and configuration are also important parameters.

A further requirement in many stretch wrapping applications is that the film displays a certain degree of adhesive or cling behaviour enabling a film closure of the package to be achieved without resort to use of additional securing measures such as straps, glues or heat sealing operations. For monolayer films, such adhesion may be provided by the intrinsic film properties or by using a "cling" additive in the film formulation. An example of a cling additive which is widely used is poly(isobutene) (PIB) which term is taken to include polybutenes produced from mixed isomers of butene. For multi-layer films, it is relatively easy to provide one or more surface layers which are specifically formulated to provide cling. In general this method allows a more flexible approach to film manufacture as choice of product for the main body of the film may be made on the basis of mechanical performance and the surface layers can be specially formulated for adhesion. Those skilled in the art will appreciate the multiplicity and flexibility of the choices of possible film structures.

A further requirement for the film producer is that the fabrication of the film is made as easy as possible by the use of polyethylenes having processing characteristics which allow film extrusion to be carried out as easily as possible. The use of a product of lower molecular weight or broader molecular weight distribution provides easier processability, but normally at the expense of a reduction in mechanical performance of the film. Similarly the use of products such an LDPE containing long chain branches (LCB) may assist processability but at the expense of stretchability in the subsequent wrapping process.

We now found that a particularly advantageous combination of film properties may be obtained by producing a stretch film from the novel copolymers described in the aforementioned WO 00/68285. The films have a particularly advantageous combination of properties, combining high impact resistance with easy processability and good performance in stretch wrapping and when combined with polyisobutene as a cling enhancer, the films show a particularly advantageous control of cling force.

Thus according to the present invention there is provided a stretch film comprising a cling additive in amount >0.5% and having (a) dart impact of >450 g
(b) MD tear strength of >190 g/25 $\mu$m
(c) MD elongation at break of >450% said film comprising a copolymer of ethylene and an alpha-olefin having from 3 to 10 carbons atoms, said copolymer having (a) a density in the range 0.900 to 0.940
(b) an apparent Mw/Mn of 2–3.4
(c) $I_{21}/I_2$ from 16 to 24
(d) activation energy of flow from 28 to 45 kJ/mol
(e) a ratio Ea(HMW)/Ea(LMW)>1.1, and
(f) a ratio g'(HMW)/g'(LMW) from 0.85 to 0.95.

The preferred stretch films according to the present are those having a dart impact of >600 g and most preferably >1100 g.

The preferred films show an elongation of >500%.

The cling additive may be present in amount >2% and most preferably in amount of greater than or equal to 4%.

The preferred cling additive is polyisobutene (PIB).

The novel stretch films of the present invention may also be utilised in multi layer films, for example in 3-layer films wherein the other layers comprise polymers of lower density or copolymers as described above.

When extruded into a stretch film by film blowing, the products of the invention give produce films with a particularly advantageous balance of properties. The processability of the ethylene copolymers during the film production process is typically comparable if not better than an LLDPE type polymer produced from a ziegler catalyst. The processability is assessed from measures such as the melt pressure in extrusion, the output rate for a given set of extruder conditions and the motor load. Such processing performance allows these products to be a "drop-in" for existing LLDPE grades of similar specification without having to make expensive changes to extrusion machinery or suffering a handicap in terms of extrusion performance.

As regards mechanical performance the dart impact of the films is very high compared to a ziegler product of similar specification, being typically more than 600 g and preferably more than 1100 g for a film of thickness 25 $\mu$m for a product of melt index about 1 and density 917. Film elongation is maintained at more than 500% despite the presence of LCB. It is important that the film can be stretched to 300% or more without fracturing.

Due to their unique structure, the films of the invention show an advantageous behaviour whilst undergoing stretching that the film width is not unduly reduced. For a pre-stretch of 70% the films retain over 75% of their initial width, this property being retained during storage of the film roll for up to one month or more.

The films of the invention show a hi-cling force as assessed by a Thimon stretch wrapping machine. A particularly advantageous behaviour is that the cling force varies only weakly with the amount of PIB cling agent added to the film. Hence there is a wide latitude for addition levels of PIB to vary without causing either too much or too little cling to develop in the film.

Good elongation combined with outstanding impact resistance provides significant advantages in wrapping applications.

In the application of polyethylene copolymer products in blown films, a key performance compromise is the balance between the modulus of the film and its impact performance. In general, alterations to the polymer structure such as increasing the crystallinity lead to increased modulus but at the expense of reduced impact performance. The advent of metallocene catalysed products has lead to a redefinition of this performance compromise. It is generally acknowledged that blown films from copolymers produced from metallocene catalysts have a different balance of properties when compared to LLDPE type products produced by the more well established ziegler catalysts. When comparing products of the same basic specification in melt index and density, the metallocene products tend to have very high impact properties due to narrow molecular weight distribution and reduced modulus due to homogeneity of comonomer distribution.

We have found that the copolymers of the present invention can offer increased modulus and impact when compared to more conventional ziegler products while at the same time having no penalty in extrusion performance. For a given balance of performance in impact and modulus, the creep performance of the inventive resins is also better than conventional Ziegler products, as are the film optical properties. Sealing is also improved. Hence the resins of the invention show many advantages without displaying any disadvantage in processing.

A particular application of blown films is for use in heavy duty sacks for example for use for fertilisers, plastic pellets, etc. The mechanical properties of stiffness, impact and creep resistance are of prime importance for the suitability of the copolymer product. Because of the intrinsic high impact resistance, the stiffness of the copolymers can be increased while maintaining a better impact resistance compared with conventional products. Also due to the superior SCBD of the copolymers the cereep resistance (creep elongation) is significantly improved leading to advantages in handling of the filled bags and provides a potential for significant downgauging while maintaining similar performance to reference proprietary products.

For this application the films of the present invention suitably comprise copolymers of density >0.920.

Thus according to another aspect of the present invention there is provided a blown film having (a) dart impact of >450 g
(b) MD tear strength >190 g/25 μm
(c) MD elongation >450% said film comprising a copolymer of ethylene and an alpha-olefin having from 3 to 10 carbons atoms, said copolymer having (a) a density >0.920,
(b) an apparent Mw/Mn of 2–3.4
(c) $I_{21}/I_2$ from 16 to 24
(d) activation energy of flow from 28 to 45 kJ/mol
(e) a ratio Ea(HMW)/Ea(LMW)>1.1, and
(g) a ratio g'(HMW)/g'(LMW) from 0.85 to 0.95.

The preferred blown films according to this aspect of the present invention are those having a dart impact of >600 g and most preferably >1100 g.

The preferred blown films show an elongation of >500%.

The novel blown films of the present invention may suitably be utilised in blends, for example with medium density polyethylenes.

The most preferred copolymers for use in the novel stretch films of the present invention are those having (a) a density in the range 0.900 to 0.940
(b) an apparent Mw/Mn in the range 2.5 to 3
(c) $I_{21}/I_2$ from 18–24
(d) activation energy of flow from 30 to 35 kJ/mol
(e) a ratio Ea(HMW)/Ea(LMW)>1.2, and
(f) a ratio g'(HMW)/g'(LMW) from 0.85 to 0.95.

By apparent Mw/Mn is meant a value of Mw/Mn uncorrected for long chain branching.

The significance of the parameters Ea(HMW)/Ea(LMW) and g'(HMW)/g'(LMW) is described below. The experimental procedures for their measurements are described later in the text.

The polymers contain an amount of LCB which is clearly visible by techniques such as GPC/viscometry and flow activation energy. The content of LCB is lower than reported in many earlier publications, but is still sufficient, when coupled with broadened Mw/Mn, to give improved processability compared to linear polymers of narrow MWD (Mw/Mn less than about 3), which do not contain LCB.

For the measurement of LCB, we have found that the most useful techniques are those which have a particular sensitivity to the presence of LCB in the high molecular weight chains. For these high molecular weight molecules, the physical effects of LCB on the solution and melt properties of the polymer are maximised. Hence detection of LCB using methods based upon solution and melt properties is facilitated.

Activation energy of flow is commonly used as an indicator of the presence of LCB in polyethylenes as summarised in the aforementioned WO 97/44371. For lower amounts of LCB, for which the global activation energy is of the order of 28 to 45 kJ/mol, it is found that the LCB has a strong effect upon the activation energy as measured at low test rates ie the region in which the rheology is dominated by the high molecular weight (HMW) species. Therefore, the ratio of activation energy derived from the low rate data Ea(HMW) tends to exceed that derived from the high rate data, Ea(LMW). Hence polymers containing LCB predominantly in the high molecular weight chains tend to show the ratio Ea(HMW)/Ea(LMW) greater than unity.

A further well established method indicating the presence of LCB is gel permeation chromatography with on-line detection of viscosity (GPC/OLV). By combining the data from 2 detectors, the ratio g' can be derived as a function of molecular weight; g' is the ratio of the measured intrinsic viscosity[η] divided by the intrinsic viscosity $[\eta]_{linear}$ of a linear polymer having the same molecular weight. In polymers containing LCB, the g' measured at high molecular weights tends to be less than that measured at low molecular weights. To quantify this effect, we have used a simple ratio g'(HMW)/g'(LMW). g'(HMW) is the weighted mean value of g' calculated for the 30% of the polymer having the highest molecular weight, while g'(LMW) is the weighted mean value of g' calculated for the 30% of the polymer having lowest molecular weight. For linear polymers, g' is equal to 1 at all molecular weights, and so g'(HMW)/g' (LMW) is also equal to 1 when there is no LCB present. For polymers containing LCB, g'(HMW)/g'(LMW) is less than 1. It should be noted that the g' data can be corrected for the effect of short chain branching (SCB). This would normally be done using a mean value of SCB content, the correction being applied uniformly at all molecular weights. Such a correction has not been applied here because in measuring the ratio g'(HMW)/g'(LMW) the same correction would apply to both g' values and there would be no net effect on the results reported here. Another method to quantify LCB content in polyethylenes is by carbon-13 Nuclear Magnetic Resonance (13C-NMR). For the low amounts of LCB observed for polymers of the invention it is generally accepted that this technique can give a reliable quantification of the number of LCB points present in the polymer when the polymer is a homopolymer or a copolymer of ethylene and propylene or butene-1. For the purposes of this specification, a measurement of LCB by 13C-NMR is achieved in such polymers by quantification of the isolated peak at about 38.3 ppm corresponding to the CH carbon of a tri-functional long chain branch. A tri-functional long chain branch is taken to mean a structure for which at least the first four carbon atoms of each of the 3 chains radiating from the CH branch carbon are all present as CH2 groups. Care must be exercised in making such measures to ensure that sufficient signal:noise is obtained to quantify the resonance and that spurious LCB structures are not generated during the sample heating by oxidation induced free-radical reactions.

The above described analysis of LCB by 13C-NMR is much more difficult when the copolymer contains hexene-1. This is because the resonance corresponding to an LCB is very close to or overlapping that for the CH carbon at the branch site of the n-butyl branch obtained from this comonomer. Unless the two CH resonances can be resolved, which is unlikely using NMR equipment currently available, LCB could only be determined for an ethylene/hexene-1 copolymer using the above described technique if the amount of n-butyl branches was so low, in comparison to the amount of LCB present, that it could either be ignored or a reliable subtraction carried out on the CH resonance at about 38.3 ppm.

Using the preferred catalyst system of the present invention an ethylene/butene-1 copolymer containing 6.5 wt % butene-1 has been prepared using a continuous gas phase reactor. This polymer contained 0.12 LCB/10,000 total carbons using the 13C-NMR technique described above. The spectrum was obtained from a 600 MHz NMR spectrometer after 912,000 scans. The polymer also contained 0.25 n-butyl branches/10,000 total carbons. No detectable oxidation was observed during this analysis with a limit of detection of approximately 0.05/10,000 total carbons.

Despite a relatively low average LCB content, it would be expected that such polymers would show distinctly modified rheological behaviour in comparison with truly linear polymers. If the LCB is concentrated in the molecules of higher molecular weight, as is known to be the case, then an average value of 0.12 LCB/10,000 total carbons in the whole polymer could correspond to about 0.3 or more LCB/10,000 for molecules of molecular weight about one million. Hence these molecules would be expected to contain at least 2 LCB points per molecule, equivalent to a branched structure with 5 arms. Such molecules are known to display very different rheological properties to linear molecules.

The preferred polymers of the invention also show quite low amounts of vinyl unsaturation as determined by either infra-red spectroscopy or preferably proton NMR. For a polymer of melt index (2.16 kg) about 1, values are less than 0.05 vinyl groups per 1000 carbon atoms or even as low as less than 0.02 vinyl groups per 1000 carbon atoms. Again, for melt index (2.16 kg) about 1, total unsaturations are also low compared to some other metallocene polymers containing LCB, the total unsaturations as measured by proton NMR to be the sum of vinyl, vinylidene, tri-substituted and cis+trans di-substituted internal unsaturation being in the range of less than 0.2 to 0.5 per 1000 carbon atoms. Products with higher or lower melt index, and hence lower or higher number average molecular weights, may show respectively higher or lower terminal unsaturations, in proportion to the total number of chain ends present. Hence the total unsaturations per 1000 carbon atoms are less than $17500/M_n$ where $M_n$ is the number average molecular weight uncorrected for LCB and the vinyl unsaturations are less than $1750/M_n$.

The comonomer present in the preferred polymers of the invention is not randomly placed within the polymer structure. If the comonomer was randomly placed, it would be expected that the elution trace derived from temperature rising elution fractionation (TREF) would show a single narrow peak, the melting endotherm as measured by differential scanning calorimetry would also show a substantially singular and narrow peak. It would also be expected that little variation would be expected in either the amount of comonomer measured as a function of molecular weight by techniques such as GPC/FTIR, or the molecular weight of fractions measured as a function of comonomer content by techniques such as TREF/DV. These techniques for structure determination are also described in the aforementioned WO 97/44371, the relevant parts of which are incorporated herein by reference.

However, the comonomer may be placed in a way as to give a distinct broadening of the TREF elution data, often with the appearance of one or two or even three peaks. At a polymer density of about 918 kg/m³ the TREF data typically show two main peaks, one at about 87° C. and another distinct but smaller peak at about 72° C., the latter being about ⅔ of the height of the former. These peaks represent a heterogeneity in the amount of comonomer incorporated in the polymer chains. A third peak is often visible at about 100° C. Without being bound by any theory this peak is considered to be nothing other than a consequence of the fact that the polymer molecules of low comonomer content tend to crystallise into large chain folded crystals which melt and dissolve in the TREF experiment in a narrow range of temperatures at about 100° C. The same peak is very clearly visible in certain types of LLDPE polymers produced by ziegler catalysts and it is present in TREF analysis of MDPE and HDPE type polyethylenes. Thus, without being bound by any theory, the third peak at about 100° C. is more a result of the crystallisation of linear or near-linear molecules, than a feature which can be simply interpreted as representing a particular and separate polymer species.

The CDBI (Composition Distribution Branch Index) of the polymers is between 55 and 75%, preferably 60 to 75%, reflecting the fact that the polymers are neither highly homogeneous (CDBI>about 90%) nor highly heterogeneous (CDBI<about 40%). The CDBI of a polymer is readily calculated from techniques known in the art, such as, for example, temperature rising elution fractionation (TREF) as described, for example, in Wild et al., Journal of Polymer Science, Polymer Phys. Ed., Vol 20, p 441 (1982), or in U.S. Pat. No. 4,798,081.

The behaviour seen in melting endotherms by DSC reflects the behaviour in TREF in that one, two or three peaks are typically seen. For example three peaks are often seen for the preferred polymers of density about 918 kg/m³, when heated at 10° C./min. after crystallisation at the same rate. As is usual, it would be expected that the peaks seen in TREF and DSC would move to lower temperatures for polymers of lower density and to higher temperatures for polymer of higher density. The peak melting temperature Tp (the temperature in ° C. at which the maximum heat flow is observed during the second heating of the polymer) can be approximated by the following expression within normal experimental errors:

$$Tp=462\times density-306$$

The amount of comonomer measured as a function of molecular weight by GPC/FTIR for the preferred polymers shows an increase as molecular weight increases. The associated parameter $C_{pf}$ is greater than 1.1. The measurement of $C_{pf}$ is described in WO 97/44371.

The preferred copolymers exhibit extensional rheological behaviour, in particular strain-hardening properties, consistent with the presence of long chain branching.

The copolymers may suitably be prepared by use of a metallocene catalyst system comprising, for example a traditional bisCp metallocene complex or a complex having a 'constrained geometry' configuration together with a suitable activator.

Suitable complexes, for example, are those disclosed in WO 95/00526 the disclosure of which is incorporated herein by reference.

Suitable activators may comprise traditional aluminoxane or boron compounds for example borates again disclosed in the aforementioned WO 95/00526.

Preferred metallocene complexes for use in the preparation of the copolymers may be represented by the general formula:

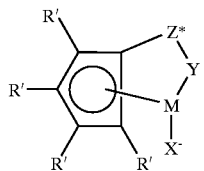

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral →$^4$ bonded diene group having up to 30 non-hydrogen atoms, which forms a ⇒complex with M;

Y is —O—, —S—, —NR*—, —PR*—,

M is titanium or zirconium in the +2 formal oxidation state;

Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-→$^4$-1,4-diphenyl-1,3-butadiene, s-trans-→$^4$-3-methyl-1,3-pentadiene; s-trans-→$^4$-2,4-hexadiene; s-trans-→$^4$-1,3-pentadiene; s-trans-→$^4$-1,4-ditolyl-1,3-butadiene; s-trans-→$^4$-1,4-bis(trimethylsilyl)-1,3-butadiene; s-cis-→$^4$-3-methyl-1,3-pentadiene; s-cis-→$^4$-1,4-dibenzyl-1,3-butadiene; s-cis-→$^4$-1,3-pentadiene; s-cis-→$^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is $C_{1-10}$ hydrocarbyl.

Most preferred complexes are amidosilane- or amidoalkanediyl complexes.

Most preferred complexes are those wherein M is titanium.

Specific complexes suitable for use in the preparation of the novel copolymers of the present invention are those disclosed in the aforementioned WO 95/00526 and are incorporated herein by reference.

A particularly preferred complex for use in the preparation of the novel copolymers of the present invention is (t-butylamido) (tetramethyl-→$^5$-cyclopentadienyl) dimethyl silanetitanium-→$^4$-1,3-pentadiene.

The activator may preferably be a boron compound for example a borate such as ammonium salts, in particular.

triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
N,N-dimethylanilinium tetrakis(pentafluorophenyl) borate,
N,N-diethylanilinium tetrakis(pentafluorphenyl) borate.

Another type of activator suitable for use with the metallocene complexes are the reaction products of (A) ionic compounds comprising a cation and an anion wherein the anion has at least one substituent comprising a moiety having an active hydrogen and (B) an organometal or metalloid compound wherein the metal or metalloid is from Groups 1–14 of the Periodic Table.

Suitable activators of this type are described in WO 98/27119 the relevant portions of which are incorporated herein by reference.

A particular preferred activator of this type is the reaction product obtained from alkylammonium tris(pentafluorophenyl) 4-(hydroxyphenyl) borates and trialkylaluminium. For example a preferred activator is the reaction product of bis(hydrogenated tallow alkyl) methyl ammonium tris(pentafluorophenyl) (4-hydroxyphenyl) borate and triethylaluminium.

The molar ratio of metallocene complex to activator employed in the process of the present invention may be in the range 1:10000 to 100:1. A preferred range is from 1:5000 to 10:1 and most preferred from 1:10 to 10:1.

The metallocene catalyst system is most suitably supported. Typically the support can be an organic or inorganic inert solid. However particularly porous supports such as talc, inorganic oxides and resinous support materials such as polyolefins which have well-known advantages in catalysis are preferred. Suitable inorganic oxide materials which may be used include Groups 2, 13 14 or 15 metal oxides such as silica, alumina, silica-alumina and mixtures thereof.

Other inorganic oxides that may be employed either alone or in combination with the silica, alumina or silica-alumina are magnesia, titania or zirconia. Other suitable support materials may be employed such as finely divided polyolefins such as polyethylene.

The most preferred support material for use with the supported catalysts is silica. Suitable silicas include Crosfield ES70 and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure, for example, for 5 hrs.

The support material may be pretreated with an aluminium alkyl at a temperature of −20° C. to 150° C. and preferably at 20° C. to 100° C.

The pretreated support is preferably recovered before use in the preparation of the supported catalysts.

The copolymers comprise copolymers of ethylene and alpha-olefins having 3 to 10 carbon atoms. Preferred alpha olefins comprise 1-butene, 1-hexene and 4-methyl-1-pentene. A particularly preferred alpha olefin is 1-hexene.

The copolymers are most suitably prepared in the gas phase in particular in a continuous process operating at a temperature >60° C. and most preferably at a temperature of 75° C. or above. The preferred process is one comprising a fluidised bed reactor. A particularly suitable gas phase process is that disclosed in EP 699213 incorporated herein by reference.

When prepared by use of the preferred catalyst systems described above the copolymers have a titanium content in the range 0.1 to 2.0 ppm.

EXAMPLES

Catalyst Preparation (i) Treatment of Silica

A suspension of Grace 948 silica (13 kg, previously calcined at 250° C. for 5 hours) in 110 liters (L) of hexane was made up in a 240 L vessel under nitrogen. 1 L of a hexane solution containing 2 g/L of Stadis 425 was added and stirred at room temperature for 5 minutes. 29.1 L of a 892 mmolAl/L solution of triethylaluminium (TEA) in hexane was added slowly to the stirred suspension over 30 minutes, while maintaining the temperature of the suspension at 30° C. The suspension was stirred for a further 2 hours. The hexane was filtered, and the silica washed with hexane, so that the aluminium content in the final washing was less than 0.5 mmol Al/liter. Finally the suspension was dried in vacuo at 60° C. to give a free flowing treated silica powder with residual solvent less than 0.5 wt %.

(ii) Catalyst Fabrication

All steps, unless otherwise stated, of the catalyst fabrication were carried out at 20° C. 3 L of toluene was added to a 24 L vessel equipped with a turbine stirrer, and stirred at 300 rpm. 5.01 L of a 9.5 wt % solution in toluene of bis(hydrogenated tallow alkyl) methyl ammonium tris(pentafluorophenyl)(4-hydroxyphenyl)borate was added during 15 minutes. Then 1.57 L of a 250 mmolAl/L solution in toluene of triethylaluminium was added during 15 minutes and mixture stirred for 30 minutes. The solution obtained was then transferred under nitrogen, with stirring during 2 hours, to an 80 L vessel containing 10 kg of the TEA treated silica described above. 60 L of hexane was then rapidly introduced and mixed for 30 minutes. 1.83 kg of a 7.15 wt % solution in heptane of (t-butylamido)(tetramethyl-$\eta^5$-cyclopentadienyl) dimethylsilanetitanium-$\eta^4$-1,3-pentadiene was added during 15 minutes. Mixing was continued for 1 hour and 1 L of a 2 g/L hexane solution of stadis 425 was added. The catalyst slurry was then transferred to a vessel of volume 240 L and 70 L of hexane added. Excess solvent was removed by decantation, and a further 130 L of hexane added. This process was repeated until less than 0.2 L of toluene remained in the solvent. 1 L of a 2 g/L hexane solution of stadis 425 was then added and the catalyst dried under vacuum at 40° C. to a residual solvent level of 1 wt %.

(iii) Polymerisation Using Continuous Fluidised Bed Reactor

Example 1

Ethylene, 1-hexene, hydrogen and nitrogen were fed into a continuous fluidised bed reactor of diameter 45 cm. Polymerisation was performed in the presence of a catalyst similar to that prepared above. Polymer product was continuously removed from the reactor. Operating conditions are given in Table 1.

Example 2

The procedure for example 1 was scaled up to produce a catalyst of batch size approximately 75 kg. This catalyst was used to produce a copolymer in a commercial gas phase scale reactor of diameter 5 meters again using the conditions shown in Table 1.

TABLE 1

| Example | 1 | 2 |
|---|---|---|
| total pressure (bar) | 20.0 | 19.8 |
| temperature (° C.) | 80 | 75 |
| ethylene pressure (bar) | 7.5 | 8.1 |
| $H_2/C_2$ ratio | 0.0025 | 0.0023 |
| $C_6/C_2$ ratio | 0.0055 | 0.0050 |
| production (kg/hr) | 74 | 8700 |

Comparative Example 1

A film from Dowlex 2045 was used for comparison.

3 layer films were produced on a coextrusion operating line at about 100 kg/hr. This line was equipped with 4 25 L/D LLDPE extruders and a 300 mm diameter die with 1.2 mm die gap. The film was of thickness 25 mm and the blow up ratio 2.5:1. The inner cling layer was formed from an EVA copolymer containing TAC 100 (50% PIB). The other layers were formed from the test polymer containing TAC 100.

Details of the copolymers prepared and films produced are given in Table 2.

TABLE 2

| Example | | Comp 1a | Comp 1b | Comp 1c | 1a | 1b | 1c | 2a |
|---|---|---|---|---|---|---|---|---|
| | | Film properties | | | | | | |
| MI/2.16 | g/10 mm | 0.91 | 0.91 | 0.91 | 1.18 | 1.18 | 1.18 | 1.3 |
| HLMI | g/10 mm | 25.8 | 25.8 | 25.8 | 23.70 | 23.70 | 23.70 | 25.80 |
| MFR | | 28.4 | 28.4 | 28.4 | 20.1 | 20.1 | 20.1 | 19.8 |
| Density | kg/m$^3$ | 919.4 | 919.4 | 919.4 | 916.6 | 916.6 | 916.6 | 916.9 |
| | | EXTRUSION CONDITIONS | | | | | | |
| Melt pressure | bar | 533 | 494 | 460 | 508 | 496 | 467 | 454 |
| Melt temperature | °C. | 232 | 232 | 231 | 229 | 233 | 230 | 228 |
| Output | kg/h | 95 | 95 | 95 | 110 | 110 | 110 | 110 |
| Motor Load | A | 55 | 50 | 50 | 54 | 51 | 49 | 49 |
| Blend | | 4% PIB | 5% PIB | 6% PIB | 4% PIB | 5% PIB | 6% PIB | 5% PIB |
| | | MECHANICAL PROPERTIES | | | | | | |
| Dart Impact | g | 265 | 350 | 310 | >1100 | >1100 | >1100 | >1100 |
| Elementdorf tear str. MD | g/25 µm | | 255 | | | 207 | | 196 |
| TD | g/25 µm | | 656 | | | 577 | | 572 |
| Elongation at break MD | % | | 670 | | | 640 | | 600 |
| TD | % | | 780 | | | 660 | | 680 |

Example 3

A resin was produced in the gas phase using a similar catalyst system to that described above with melt index 1 and density 923.6 kg/m$^3$. This was extruded into film 150 µm thick on a Reifenhauser blown film line equipped with a die of diameter 150 mm and die gap 2.3 mm. The product was extruded both pure and blended with 20% of a medium density polyethylene of density about 938 kg/m$^3$, melt index about 0.2 produced using a chromium catalyst system.

Comparative Example 2

Dowlex 2045 was used as a comparative example.

The blown film properties are given in Table 3 below. The films were also tested in creep at 60° C. under 5 Mpa load. After 200 minutes, the deformation of the film of example 1b was 57% compared to 63% for comparative example 2

TABLE 3

| Example | | 1a | 1b | Comp 1 |
|---|---|---|---|---|
| MI/2.16 | g/10 mn | 1.00 | 1.00 | 0.94 |
| HLMI | g/10 mn | 23.46 | 23.46 | 26.8 |
| MFR | | 23.5 | 23.5 | 28.5 |
| Density | kg/m$^3$ | 923.6 | 923.6 | 919.7 |
| | EXTRUSION | | | |
| Die | mm | 150 | 150 | 150 |
| Die gap | mm | 2.3 | 2.3 | 2.3 |
| Screw speed | rpm | 83.4 | 85 | 89.2 |
| Melt pressure | bar | 267 | 283 | 268 |
| Melt temperature | °C. | 216.7 | 217 | 217.1 |
| Output | kg/h | 50 | 50 | 50 |
| BUR | | 2:1 | 2:1 | 2:1 |
| Motor Load | A | 62 | 65 | 61 |
| Specific energy | KWh/Kg | 0.22 | 0.23 | 0.23 |
| Thickness | µm | 150 | 150 | 150 |
| Blend | | pure | +20% MDPE | +20% MDPE |
| | MECHANICAL PROPERTIES | | | |
| Dart impact | g | 1295 | 1084 | 890 |
| Edge fold impact (Staircase Method) (g) | | 805 | 735 | 650 |

TABLE 3-continued

| Example | | | 1a | 1b | Comp 1 |
|---|---|---|---|---|---|
| Elmendorf tear str. | MD | g/25 µm | 260 | 210 | 341 |
| | TD | g/25 µm | 418 | 471 | 573 |
| Tensile str. at yield | MD | MPa | 12.9 | 14.4 | 12.5 |
| | TD | MPa | 14 | 14.6 | 13.4 |
| Tensile str. at break | MD | MPa | 48 | 45.6 | 43.9 |
| | TD | MPa | 47.5 | 41.6 | 42.5 |
| Elongation at break | MD | % | 1250 | 862 | 930 |
| | TD | % | 1000 | 917 | 1000 |
| Secant modulus 1% | MD | MPa | 235 | 263 | 208 |
| | TD | MPa | 285 | 298 | 239 |
| Haze | | % | 23.8 | 22.5 | 19.8 |
| Gloss 45° | | %$_0$ | 57.7 | 49.4 | 47.9 |

Methods of Test

Melt index (190/2.16) was measured according to ISO 1133.

Melt flow ratio (MFR) was calculated from the ratio of flow rates determined according to ISO 1133 under condition (190/21.6) and condition (190/2.16).

Density was measured using a density column according to ISO 1872/1–1986, except that the melt index extrudates were not annealed but were left to cool on a sheet of polymeric material for 30 minutes.

Dart impact was measured by ASTM D1709, tear strength by ASTM D1922, and haze by ASTM D1003.

The invention claimed is:

1. A stretch film comprising a cling additive in amount >0.5% and having (a) dart impact of >450 g (b) MD tear strength of >190 g/25 µm (c) MD elongation at break of >450%, said film comprising a copolymer of ethylene and an alpha-olefin having from 3 to 10 carbons atoms, said copolymer having
  (a) a density in the range 0.900 to 0.940
  (b) an apparent Mw/Mn of 2–3.4
  (c) $I_{21}/I_2$ from 16 to 24
  (d) activation energy of flow from 28 to 45 kJ/mol
  (e) a ratio Ea(HMW)/Ea(LMW)>1.1, and
  (f) a ratio g'(HMW)/g'(LMW) from 0.85 to 0.95.

2. A stretch film according to claim 1 having a dart impact >600 g.

3. A stretch film according to claim 1 having a dart impact >1100 g.

4. A stretch film according to claim 1 having a MD elongation of >500%.

5. A stretch film according to claim 1 wherein the cling additive is present in amount >2%.

6. A stretch film according to claim 1 wherein the cling additive is polyisobutene (PIB).

* * * * *

UNITED STATES PATENT AND TRADEMARK OFFICE
CERTIFICATE OF CORRECTION

PATENT NO. : 6,998,440 B2  Page 1 of 1
APPLICATION NO. : 10/296830
DATED : February 14, 2006
INVENTOR(S) : Frederic Alarcon et al.

It is certified that error appears in the above-identified patent and that said Letters Patent is hereby corrected as shown below:

Column 13, line 44, change "1b" to "3b";

Column 13, line 47, first line of Table 3, change "1a" to "3a"; "1b" to "3b"; and "Comp 1" to "Comp 2"; and Column 14, line 30, first line of Table 3 - continued, change "1a" to "3a"; "1b" to "3b"; and "Comp 1" to "Comp 2".

Signed and Sealed this

Fifth Day of February, 2008

JON W. DUDAS
*Director of the United States Patent and Trademark Office*